United States Patent Office 2,855,224
Patented Oct. 7, 1958

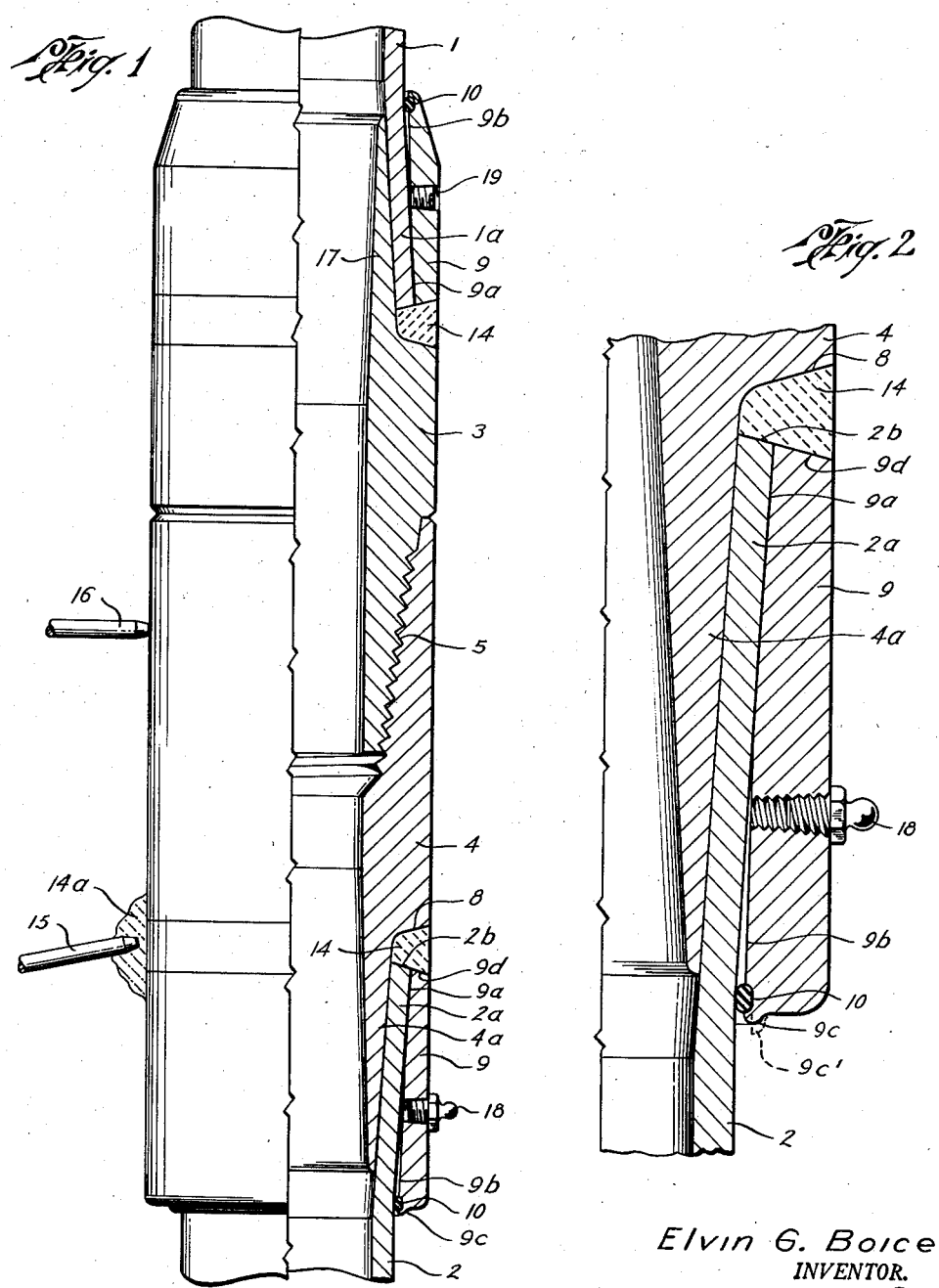
Elvin G. Boice
INVENTOR.

2,855,224

LUBRICATED CONICALLY TAPERED DRILL STEM JOINT

Elvin G. Boice, Houston, Tex., assignor to Reed Roller Bit Company, Houston, Tex., a corporation of Texas Application May 28, 1951, Serial No. 228,672

4 Claims. (Cl. 285—94)

This invention relates to pipe joints.

The conventional drill stem comprises a number of sections of drill pipe connected together by tool joints. The conventional tool joint includes two members, one known as a box member and the other as a pin member. The box member is secured to one end of each drill pipe section and the pin member to the other end. The pin and box members are provided with threads whereby the members may be readily connected and disconnected from each other to assemble and dissemble the drill stem.

A specific object of this invention is to provide a new and improved tool joint that may be applied to "plain end" drill pipe (that is, pipe having ends not specially threaded, upset or otherwise prepared for connection to a tool joint) and which will provide a strong and durable connection between the pipe and the joint capable of withstanding the great strains to which such connections are subjected in deep well drilling.

Another specific object of the invention is to provide a new and improved connection between a tool joint member and a pipe including parts that are relatively movable during the flexing of the drill stem in deep well drilling whereby concentration of stresses and consequent failure is prevented.

Other objects will hereinafter appear.

The preferred embodiment of the invention is illustrated by the accompanying drawings in which Fig. 1 is a partly sectional elevation of my new and improved tool joint connecting two sections of drill pipe together, and Fig. 2 is an enlarged detail view illustrating the union of the body of the tool joint, the pipe and the collar.

In the drawings, one section of drill pipe is indicated at 1 and the other section at 2. The pin member of my new and improved tool joint is indicated at 3 and the box member at 4, said members being connected together by conventional threads 5.

The pipe 2 has a flared end section 2-a. The box member 4 has a reduced tapered end 4-a fitting tightly in the section 2-a and terminating substantially with the interior surface of the section 2-a. The collar 9 has a tapered surface 9-a to tightly fit the outer portion of the exterior surface of the section 2-a and another tapered surface 9-b to provide a gradual change from said tight fit to a loose fit between the collar 9 and the inner portion of the pipe section 2-a. The numeral 10 indicates a sealing ring made of rubber or the like. This sealing ring fits within an internal annular groove in the end of the collar 9, the outer wall of which groove may be formed by peening the flange 9-c into the position shown after the ring 10 is in place. It will be understood that the flange 9-c originally occupied the position shown by the dotted lines 9-c' to permit insertion of the sealing ring 10.

The numeral 8 indicates the shoulder formed by the reduction of the end 4-a of the tool joint member 4. This shoulder 8 may be tapered inwardly as shown. The end 9-d of the collar 9 and the end 2-b of the pipe section 2-a may be machined as shown to provide a trough for the reception of the welding material 14.

The numeral 15 indicates an electrode submerged in the flux 14-a, and the numeral 16 the other electrode connected to the joint, to illustrate the use of well-known submerged arc welding in the assembling of the parts provided by my invention.

It will be understood that the pin member 3 is connected to the pipe 1 in the same manner as the box member 4 is connected to the pipe 2. The pipe 1 has an end section 1-a in which tightly fits the tapered reduced end 17 of the pin member 3.

The parts may be assembled as follows: Two collars such as the collars 9 may be placed upon a section of pipe such as that indicated at 2. The ends of the pipe 2 may be heated and flared with conventional equipment so that each end of the pipe will have a flared section such as that indicated at 2-a. When the pipe section 2-a is hot, the reduced end 4-a of the tool joint member 4 may be inserted in the end section 2-a of the pipe. Or the reduced end 4-a of the tool joint member 4 may be pressed in the end section 2-a of the pipe after the latter has cooled. The reduced end 4-a of the tool joint member 4 will therefore fit tightly in the end section 2-a of the pipe. After the end section 2-a is cold, the collar 9 may be forced on the section 2-a so that the tapered surface 9-a will very tightly engage the outer portion of the end section 2-a substantially in the position shown by the drawings. For example, the fit may be such that it will require say a 15,000 pound axial force to move the collar 9 into the position shown by the drawings. The assembly may then be preheated and the parts welded together with the welding material 14. The assembly may then be post heated to relieve stresses set up by the welding and after the assembly has been permitted to cool to room temperature, the sealing ring 10 may be inserted and the end 9-c' peened over from the position shown at 9-c' to the position shown at 9-c to hold the ring 10 in place. A lubricant may then be forced into the space between the collar 9 and the inner portion of the pipe end section 2-a through any conventional fitting 18. The fitting 18 may then be removed and replaced by a suitable plug 19 such as that shown at the upper portion of Fig. 1.

It will be understood that the welding of the parts together with the material 14 may be performed in any conventional manner. Submerged arc welding may readily be employed by placing the flux in and about the trough defined by the walls 8, 2-b and 9-d whereupon the electrode 16 having been electrically connected to the joint, the electrode 15 may be submerged in the flux and moved in a circle around the joint, or the electrode 15 may be held stationary and the joint rotated to effect the welding of the parts together.

It will also be understood that any conventional jig may be employed to force the parts together, and that the extremities 2-b and 9-d of the pipe section 2-a and the collar 9 may be machined after the parts have been forced together to provide a smooth side wall for the welding groove a predetermined distance from the shoulder 8. Thus machining the extremities 11 and 12 of the collar and pipe will permit a less accurate manufacture of the end of the member, the pipe end and the collar because if the extremities 2-b and 9-d of the collar and pipe are machined, it is not necessary that when the parts are forced together they assume exactly the desired positions for the welding operations.

When the weld 14 cools, the resulting contraction causes an additional movement of the collar 9 and the pipe end section 2-a toward the shoulder 8 to provide a tighter engagement of the parts and a wider distribution of stresses. It will be apparent from the foregoing that in the preferred embodiment the joint end 4–a, the pipe end section 2–a and the collar are all welded together by the weld 14. This provides a very strong construction, and the method of making it is relatively simple and inexpensive.

The collar 9 may be formed with a tapered elevator shoulder as shown in the connection of the pipe 1 to the pin member 3 of the tool joint; or with a square elevator shoulder as shown in the connection of the pipe 2 to the box member 4.

The gradual change from the tight fit of the tapered surface 9–a of the collar 9 and the outer portion of the end section 2–a of the pipe to the loose fit between the tapered surface 9–b of the collar 9 and the inner portion of the pipe end section 2–a is of great importance because it permits the inner portion of the pipe section 2–a to move laterally within the collar 9 to prevent concentration of stresses and consequent failure when flexing of the drill stem takes place in deep well drilling.

The seal 10 will prevent the entrance of drilling fluid into the space between the collar 9 and the inner portion of the end section 2–a of the pipe and will also serve to retain the lubricant therein.

The invention is not limited to the preferred embodiment herein disclosed. Various changes within the scope of the following claims will be apparent to those skilled in the art.

This application is a continuation-in-part of the application Serial No. 190,275, filed October 16, 1950, Elvin G. Boice, Joint and Method of Making the Same; now Patent 2,711,912, June 28, 1955.

I claim:

1. The combination of a drill pipe having a flared end, a tool joint member having a reduced tapered end with the free end portion thereof fitting in the flared end of said pipe, a collar having an inwardly tapered surface fitting on the flared end of said pipe and agreeing with that on said flared end and another tapered surface merging with said first mentioned tapered surface and diverging from the surface on said flared end whereby the fit of said collar on said flared end varies gradually from a tight fit at the outer portion of said flared end to a loose fit at the inner portion of said flared end, the flared end of the pipe being substantially tightly clamped between the free end portion of said tool joint member and said collar, the tapered surfaces of the said end of said member and said collar converging slightly toward the shoulder of said member formed by the reduction of the end of said member to engage the end of said pipe, said shoulder being tapered inwardly and the adjacent extremities of said pipe and collar being substantially flush and axially spaced from said shoulder and tapered inwardly to form with said shoulder and the body of said member an outwardly open circumferential trough for the reception of welding material, and welding material in said trough uniting together said shoulder, the body of said member, and the ends of said pipe and collar, the outer surface of said collar being substantially flush with the outer surface of said tool joint member.

2. The combination as set forth in claim 1 including a rubber sealing ring between the inner portion of said flared end and the diverging tapered surface of said collar in the region where said collar loosely fits said flared end.

3. The combination as set forth in claim 2 including means on said collar whereby lubricant may be introduced into the space formed by the loose fit between the inner portion of said flared end and said collar and by said sealing ring.

4. The combination as set forth in claim 3 in which said tool joint member and collar are of substantially the same external diameter and in which said welding material fills said trough.

References Cited in the file of this patent

UNITED STATES PATENTS

| | | |
|---|---|---|
| 1,058,542 | Brown | Apr. 8, 1913 |
| 1,969,142 | McIntyre | Aug. 8, 1934 |
| 2,073,093 | Brantly | Mar. 9, 1937 |
| 2,082,566 | Berndt | June 1, 1937 |
| 2,133,313 | Weatherhead | Oct. 18, 1938 |
| 2,207,170 | Elliott | July 9, 1940 |
| 2,313,308 | Allen | Mar. 9, 1943 |
| 2,391,266 | Parker | Dec. 18, 1945 |
| 2,398,555 | Parker | Apr. 16, 1946 |
| 2,438,234 | Stewart | Mar. 23, 1948 |
| 2,504,936 | Payne | Apr. 18, 1950 |
| 2,544,712 | Miller | Mar. 13, 1951 |
| 2,568,232 | Hamer | Sept. 18, 1951 |
| 2,711,912 | Boice | June 28, 1955 |

FOREIGN PATENTS

| | | |
|---|---|---|
| 436,041 | Great Britain | Oct. 3, 1935 |